March 11, 1952  J. BARKSDALE  2,588,465
CUTTERHEAD FOR WOOD TURNING LATHES
Filed May 19, 1947
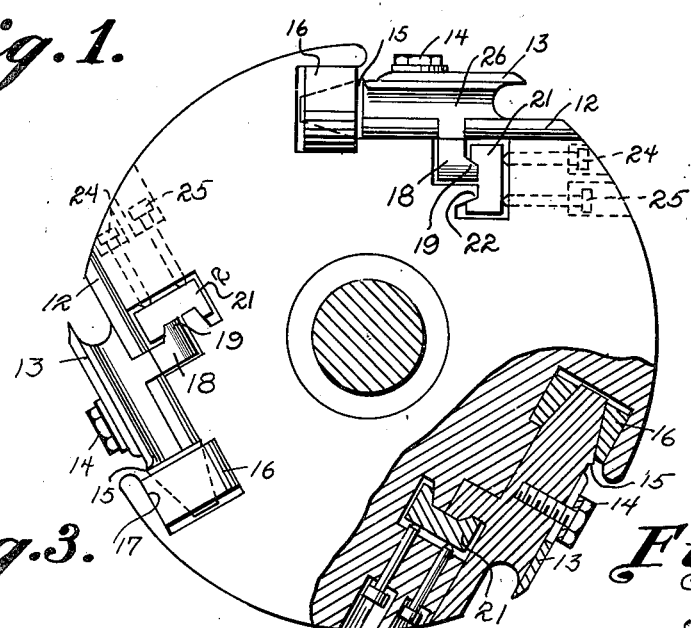
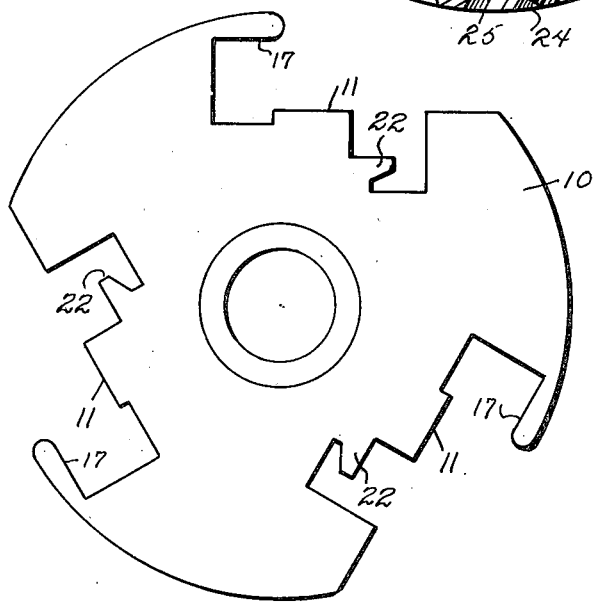
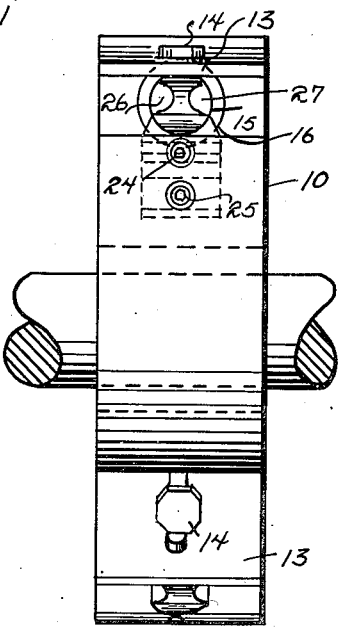
INVENTOR.
James Barksdale
BY *Victor J. Evans & Co.*
ATTORNEYS Patented Mar. 11, 1952

2,588,465

UNITED STATES PATENT OFFICE 2,588,465

CUTTERHEAD FOR WOOD-TURNING LATHES

James Barksdale, Blytheville, Ark.

Application May 19, 1947, Serial No. 748,958

1 Claim. (Cl. 144—230)

This invention relates to cutterheads for wood-turning lathes.

It is an object of the present invention to provide a simple means for adjustably connecting a cutting blade to a cutterhead of a wood-turning lathe wherein the blade can be adjusted to extend at different distances beyond the periphery of the cutterhead and wherein the same can be tilted to cut more one one side than the other in the same manner that a carpenter's plane may have its blade adjusted in the holder frame to extend different distances beyond the bottom surface of the plane or to have one side edge extend at a greater distance below the bottom of the plane than the opposite side edge to assist in making a bevel cut.

It is another object of the present invention to provide a cutterhead for wood-turning lathes wherein the knife or cutting blade may be tilted to an angle so as to allow the use of flat ground knives, instead of conventional milled knives, for making contour turnings and wherein the knives can be set to make a sheer cut.

Other objects of the present invention are to provide a blade holder for cutterheads of wood-turning lathes which is of simple construction, inexpensive to manufacture and efficient in operation.

For other objects and for a better understanding of the invention, reference may be had to the following detailed description taken in connection with the accompanying drawing, in which:

Fig. 1 is an end view of a cutterhead with a portion broken away and shown in section to show more clearly the connection of the blade and its holder with the cutterhead.

Fig. 2 is a side elevational view of the cutterhead with the blade and holder attached.

Fig. 3 is an end elevational view of the cutterhead with the blade and holder removed from the same.

Referring now to the figures, 10 represents the cutterhead plate which is recessed at three places about its periphery in the manner as indicated at 11. Within the recess 11 there is disposed my holder 12 and its cutting blade 13. The cutting blade 13 is secured to the top of the holder by a set screw 14 and may be adjusted in or out for different cutting depths and to extend the same to different distances beyond the periphery of the cutterhead plate 10. The holder 12 is generally round in cross section and has a tapered end 15 which is fitted in a sleeve 16 which can be retained in a portion 17 of the recess 11.

The holder has a depending projection 18 with an arcuate end surface and a hook formation 19 thereon over which is clamped a channel shaped clamping plate 21 with a recess on its inner face adapted to receive the hook formation 19 and adapted to receive a hook formation 22 integral with the cutterhead 10. When the member 21 is in place and the holder has been properly adjusted by rotation or longitudinally of the head 19 on the bottom of the recess, the clamping screws 24 and 25 may be tightened whereby to hold the projection 18 in its adjusted position and the holder 12 at a new angle.

The clamping member 21 is of such shape that it can be moved about in the opening so as to best locate itself upon the hook formations 19 and 22 so that a proper engagement will be made therewith and so that the holder will be retained in the position to which it has been adjusted.

The holder 12 is cut away as indicated at 26 and 27 on the opposite sides providing a member H-shape in cross section having openings at the sides so as to provide a clearance for the shavings.

The blade 13 can be adjusted rotatively in the holder whereby one edges of the blade can be advanced ahead of the opposite edge or side of the blade and also the holder and the blade can be adjusted longitudinally of the cutterhead by permitting the movement of the sleeve 16 through the portion 17 of the recess 11 and the projection 18 through the portion of the recesses to which it is extended.

While various changes may be made in the detail construction, it shall be understood that such changes shall be within the spirit and scope of the present invention as defined by the appended claim.

I claim:

In a blade mounting for a cutterhead, the combination which comprises a cylindrical body having tangentially disposed blade seats with inwardly extended recesses therein providing a cutter head, said inwardly extended recesses having hook like projections in offset sections thereof, a blade holder H-shaped in cross section positioned in each of said recesses, said blade holder having a positioning shank on the inner end extended into a socket in said body and having an arcuate under surface, said blade holder having a hook like projection extended from said arcuate surface and positioned in the offset section of the recess with the end thereof in abutting relation with said hook like projection of the body, said hook like projection of the blade holder being in alignment with the hook like projection of the body and both of said projections having bevelled surfaces on the sides thereof opposite to the sides in abutting relation, said hook like projection of the blade holder having an arcuate end surface, a channel shaped clamp having a back with flanges on the edges and the inner surfaces of said flanges being beveled providing complementary beveled surfaces to the beveled surfaces of the projections whereby pressure against the back of the channel shaped clamp wedges the hook like projections against each other, clamping screws threaded in the body and positioned to engage the back of said channel shaped clamp for forcing the clamp toward the hook like projections, and a cutter blade with a slot therein secured to the outer surface of said blade holder.

JAMES BARKSDALE.

REFERENCES CITED

The following references are of record in the file of this patent:

UNITED STATES PATENTS

| Number | Name | Date |
|---|---|---|
| 279,117 | Allen | June 12, 1883 |
| 828,958 | Nelson | Aug. 21, 1906 |
| 866,549 | Winningham | Sept. 17, 1907 |
| 874,871 | Shimer | Dec. 24, 1907 |
| 1,032,636 | Watkins | July 16, 1912 |
| 1,191,728 | Plummer | July 18, 1916 |